United States Patent [19]

Skarvada

[11] 4,323,969
[45] Apr. 6, 1982

[54] APPARATUS FOR GENERATING A REFERENCE SIGNAL IN A BRAKE CONTROL SYSTEM

[75] Inventor: Thomas Skarvada, Woodland Hills, Calif.

[73] Assignee: Crane Co., Chicago, Ill.

[21] Appl. No.: 60,573

[22] Filed: Jul. 25, 1979

[51] Int. Cl.$^3$ ............................ G06F 15/20; B60T 8/08
[52] U.S. Cl. ...................................... 364/426; 303/95; 303/109
[58] Field of Search .................... 364/426; 303/94, 95, 303/106, 109

[56] References Cited

U.S. PATENT DOCUMENTS

| | | | |
|---|---|---|---|
| 3,729,234 | 4/1973 | Hirzel | 303/109 |
| 3,737,201 | 6/1973 | Okamoto et al. | 303/109 X |
| 3,804,470 | 4/1974 | Slavin et al. | 303/109 |
| 4,089,564 | 5/1978 | Öberg | 303/109 |

Primary Examiner—Jerry Smith
Attorney, Agent, or Firm—Hume, Clement, Brinks, Willian & Olds, LTD.

[57] ABSTRACT

An apparatus for generating a reference signal in a brake control system stores a reference signal representative of a reference braking condition and compares this reference signal with a conditioned wheel signal. Depending on the outcome of the comparison, the reference signal is either updated to correspond to a reduced reference braking condition or ramped to correspond to an increased braking condition. The reference signal is not simultaneously ramped and updated, and is, therefore, precisely controlled. The amount by which the reference signal is ramped is a function of the past history of the reference signal: each time the reference signal is ramped the ramp rate is increased and each time the reference signal is updated the ramp rate is decreased. The disclosed apparatus generates the conditioned wheel signal from the wheel signal by averaging the maximum and minimum wheel signals in a preselected group and by then reducing this average by an amount proportional to the difference between the maximum and minimum wheel signals. In this way undesirable oscillations, such as those due to pitching of the wheel truck, are filtered out.

16 Claims, 4 Drawing Figures

4,323,969

APPARATUS FOR GENERATING A REFERENCE SIGNAL IN A BRAKE CONTROL SYSTEM

BACKGROUND OF THE INVENTION

The present invention is directed to an improved apparatus for generating a reference signal representative of a reference braking condition in a brake control system. The apparatus of this invention is particularly useful in brake control systems such as antiskid systems and automatic braking systems, for example.

One type of commercially used brake control system includes means for generating a reference signal, such as a reference wheel velocity or a reference wheel acceleration, for example, which is representative of a reference braking condition. Generally, the brake control system also includes means for comparing the measured wheel signal with the reference signal, as well as means for modifying the braking action as necessary to bring the wheel signal into the desired relationship with the reference signal.

In a velocity based antiskid system, the reference signal may represent a desired wheel speed for an optimum level of braking effort and the modifying means may be designed to modify the braking effort as necessary to maintain the measured wheel speed automatically equal to the reference signal. Alternately, the reference signal may represent a reference wheel acceleration, and it may be compared with measured wheel acceleration to determine the appropriate level of braking effort. In the following description, these two types of brake control systems will be referred to as velocity-based systems and acceleration-based systems, respectively.

A further feature of many modern brake control systems is that the reference signal is generated either wholly or partly by measuring the rotation of a braked wheel. Often, the same wheel both provides information used to generate the reference signal and is braked by an amount controlled by the brake control system. This arrangement provides the important advantage that each braked wheel can be provided with an independent brake control system if desired. A high degree of redundancy and reliability is possible with this approach in that reference signals need not be shared by multiple wheels. Furthermore, variations in wheel or tire diameter, which may cause variations in measured wheel speed or acceleration, can be readily accommodated when a separate reference signal is maintained for each wheel.

There are, of course, difficulties in generating an accurate reference signal from measurements made on a braked wheel. Perhaps most important, a braked wheel is subject to variations in its rotational velocity as the braking effort is modified. At one extreme a braked wheel may rotate at a velocity comparable to that of an unbraked wheel; while at the other extreme, a braked wheel may be locked by the brakes. Intermediate conditions include slip velocities of zero to 100 percent of the unbraked wheel velocity. These variations in the wheel velocity as a function of braking effort complicate the generation of an accurate and reliable reference signal. An accurate reference signal may be crucial to proper brake control system operation, in that an inaccurate reference signal may result in a braking effort that is either greater or less than the optimum level.

SUMMARY OF THE INVENTION

The present invention is directed to an improved apparatus for generating a reference signal in a brake control system.

According to a first feature of the invention, means are provided for storing a reference signal and for comparing the stored reference signal with a wheel signal representative of the rotation of a braked wheel. Depending on the outcome of the comparison, the reference signal is then either increased or decreased, as appropriate.

In the past, brake control systems have often employed means for increasing a reference signal and means for simultaneously decreasing the reference signal, such that the net change in the reference signal was equal to the difference between the changes induced by the increasing and the decreasing means. One disadvantage of this prior art approach is that the net change in the reference signal is the sum of two separate effects. If, as is often the case, both effects are functions of separate variables, then the net change is itself a composite of all of these variables.

This first feature of the invention provides precise control over the reference signal by selectively enabling either means for increasing the reference signal or means for decreasing the reference signal, depending on the outcome of the comparison between the reference signal and the wheel signal. In that the reference signal is not increased and decreased simultaneously, the change in the reference signal can be precisely controlled. For example, when it is desired to decrease the reference signal, only those parameters which are relevant are utilized, and all other parameters, such as those which are relevant only where the reference signal is being increased, are completely excluded. A primary object of this first feature of the invention is to provide improved precision in controlling the magnitude of the reference signal.

According to a second feature of this invention, a brake control system includes means for storing a reference signal and means for comparing the stored reference signal with a wheel signal. The reference signal is ramped whenever the wheel signal corresponds to a more severe braking condition than does the reference signal. The rate at which the reference signal is ramped is adjusted according to the prior history of the reference signal: when the reference signal is ramped the rate is increased and when the reference signal is updated, the rate is decreased. In this context the term "ramp" denotes a change in the reference signal in the direction of increased braking effort and the term "update" denotes a change in the reference signal in the direction of reduced braking effort.

This second feature of the invention provides important advantages over certain prior art systems. For example, one system of the prior art ramps the reference signal by an amount related to wheel deceleration. This prior art approach suffers from limited dynamic range of the ramp rate, in that the acceleration of a physical object such as a wheel is limited. Furthermore, wheel acceleration may be difficult to measure accurately, and wheel acceleration may not always correspond to the desired ramp rate. For example, a locked wheel has no deceleration, yet a zero ramp rate is often suboptimal in such a situation.

In contrast, the present invention provides a ramp rate which has a large dynamic range and which adapts quickly to changing circumstances such as variations in the tire-surface coefficient of friction. The ramp rate is a function of the update/ramp history of the reference signal, and is self-correcting. Thus, if the reference signal is updated too frequently, indicating in general that the reference signal is too low, the ramp rate will be decreased to slow the rate at which the reference signal is ramped. Conversely, if the reference signal is ramped too often, indicating in general that the reference signal is too high, the rate at which the reference signal is ramped will be increased.

This second feature of the invention provides the further advantage that the system responds appropriately with a high ramp rate to a locked wheel.

A third feature of this invention is directed to a means for suppressing oscillations in a reference signal. A wheel signal often exhibits spurious oscillations which are not inclusive of significant variations in the rotation of the wheel. For example, a wheel signal transducer or wheel itself may be eccentric. Alternately, a wheel may be mounted on a wheel truck subject to truck oscillations about the pitch axis. The truck pitch oscillation can cause the load and consequently the tire diameter and the wheel velocity to oscillate, thereby introducing an oscillatory component into the wheel signal. Truck pitch oscillation has been observed in large aircraft such as the Boeing 747, and modern brake control systems for such aircraft are preferably designed to generate reliable reference signals in spite of wheel truck oscillation.

According to this third feature of the invention, a reference signal representative of a reference braking condition is generated from a conditioned wheel signal. This conditioned wheel signal is in turn generated from a wheel signal representative of the braking conditions of a braked wheel, and is representative of a braking condition greater than that corresponding to the average wheel signal during a predetermined time interval. Preferably, the magnitude of the wheel signal is measured during said predetermined period of time to determine the maximum and minimum wheel signal values and then the conditioned wheel signal is set equal to the average of the maximum and minimum values less an amount proportional to the difference between the maximum and minimum values.

In the past, brake control systems have on occasion used analog filters to filter out oscillations in the wheel signal in preselected frequency ranges. In many cases, these filters have filtered the wheel signal to a value substantially equal to the average wheel signal. However, such filters tend not to filter out the entire oscillatory component of the wheel signal, and to allow an amplitude dependent portion of this oscillatory component to pass through to form part of the conditioned signal. Thus, in prior art systems the conditioned signal may contain an undesired oscillatory component when the wheel signal includes a high amplitude oscillatory component.

Furthermore, one type of prior art brake control system operates to set the conditioned signal equal to the average of the oscillating wheel signal. It has been found in computer simulation that, in at least some brake control systems, improved brake control results from setting the conditioned signal to a value less than the average of the wheel signal. Preferably, the conditioned signal is set equal to the average wheel signal reduced by an amount corresponding to three-sixteenths of the peak-to-peak variation in the wheel signal over a predetermined time interval.

By setting the conditioned signal at a value lower than the average wheel signal, the present invention responds to oscillations in the wheel signal by generating a lower reference signal, which results in more aggressive braking. This tends to counteract the tendency of many brake control systems to command excessively low levels of braking in response to oscillations in the wheel signal.

The invention itself, together with further objects and attendant advantages, will be best understood by reference to the following detailed description taken in connection with the appended drawings.

DETAILED DESCRIPTION OF THE DRAWINGS

DETAILED DESCRIPTION OF A PREFERRED EMBODIMENT

Figure 1:
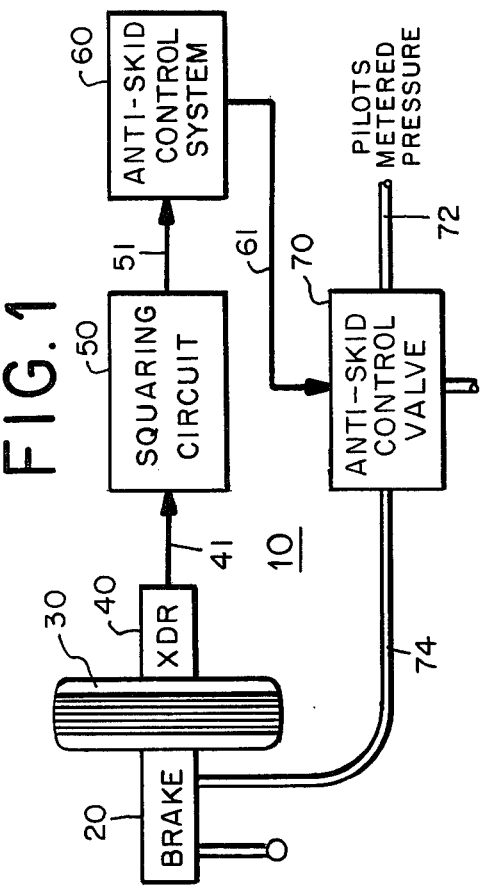
FIG. 1 is a schematic representation of a brake control system including an antiskid control system.

Referring now to the drawings, a preferred embodiment of the apparatus for determining a reference signal of the present invention will be described in connection with FIGS. 1 and 2. FIG. 1 shows the major components of an antiskid brake control system 10 which provides brake control for the brake 20 of a rotatable wheel 30. The system 10 includes a wheelspeed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a valve driver signal on line 61. The antiskid control valve 70 is positioned in the brake line 72 which supplies brake fluid under pressure to the brake 20, and the valve 70 operates to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid the full metered pressure in the line 72 is passed by the valve 70 via the line 74 to the brake 20. However, if the metered brake pressure exceeds the skid threshold and drives the wheel 30 into a skid, the antiskid system 60 will generate a signal on line 61 which causes the valve 70 to reduce the pressure in the line 74 to a value less than the metered pressure. By reducing the pressure applied to the brake 30 the braking torque is reduced and the wheel 30 is prevented from skidding.

Figure 2:
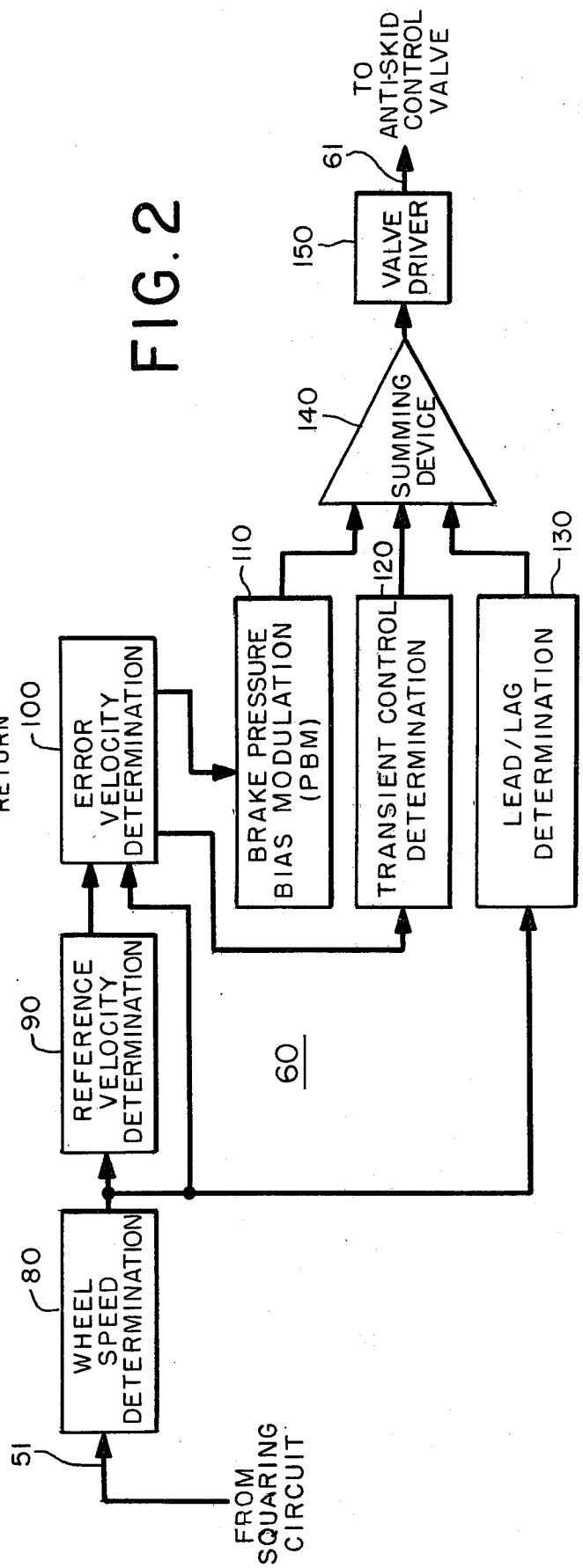
FIG. 2 is a schematic representation of the functional components of the antiskid control system of FIG. 1.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for determining a reference velocity signal as an output representative of the desired wheel speed for optimum braking. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or PBM, unit 110; and the transient control determination unit 120.

The PBM unit 110 processes the error velocity signal to arrive at a time averaged, modulated signal representative of the optimum braking pressure. This signal is modulated to either increase or decrease the applied brake pressure as needed to prevent wheel skidding while maintaining a high, effective level of braking.

Because the PBM unit 110 uses a time average, it will on occasion be unable to respond quickly enough to prevent wheel skid. For example, when a braked wheel suddenly enters a tar strip or an ice patch or a wet surface, the skid threshold will abruptly fall and the wheel may enter a deep skid if heavily braked. Under these conditions the transient control unit 120 responds to a large error velocity signal by commanding a sharp and sudden reduction in applied brake pressure.

The wheel speed signal is also applied as an input to a lead/lag unit 130 which responds to changes in the wheel speed signal to anticipate trends and to command an early modification in brake pressure to anticipate skids.

Outputs from the PBM unit 110, the transient control unit 120 and the lead/lag unit 130 are summed in the summing device 140 to produce a composite brake control signal which is amplified by the valve driver 150 and then applied as a control signal via line 61 to the antiskid control valve.

The foregoing description of the brake control system 10 is provided to set forth the environment of a preferred embodiment of the reference signal determination apparatus of this invention. Individual components of this environment do not form a part of the present invention, and for that reason have not been described in detail here. Furthermore, those skilled in the art are familiar with various forms of these components. For example, one form of the wheel speed determination unit 80, the error velocity determination unit 100, the PBM unit 110, the transient control unit 120, and the lead/lag unit 130 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; and in U.S. Pat. No. 4,125,295, issued Nov. 14, 1978 to Gerhard Ruhnam, et al.

The present invention is an improved apparatus for determining a reference signal in a brake control system. A presently preferred embodiment of this invention, corresponding to the reference velocity determination unit 90 of FIG. 2, will be described in conjunction with the flow chart of FIGS. 3a and 3b.

The presently preferred embodiment of the present invention is implemented as a programmed microprocessor. The microprocessor is a Z-80 CPU manufactured by Zilog, Inc., Cupertino, Calif. The program is presented in flow chart form in FIGS. 3a and 3b and is listed in assembly language form in Tables 1a, 1b, and 1c. This program operates to process inputs indicative of wheel speed to generate a signal representative of a reference velocity. The wheel speed input is provided as a set of the sixteen most recent wheel speed measurements. In this embodiment, wheel speed is determined about once every five milliseconds as a sixteen-bit digital signal. The wheel speed input is made up of the most recent sixteen-bit wheel speed signal and the fifteen previous sixteen-bit wheel speed signals, which are stored in consecutive order in a block of 32 eight-bit words of memory. Thus, the most recent wheel speed signal is stored in locations N and N+1 of memory; the previous wheel speed signal is stored in locations N+2 and N+3; and so forth. The wheel speed block of measurements forms a first-in first-out file in which the sixteen most recent wheel speed signals are stored. In the flow chart of FIG. 3, "Velocity No. 1" refers to the current wheel speed measurement, "Velocity No. 2" refers to the wheel speed measurement immediately preceding the current measurement, and so forth.

Figure 3A:
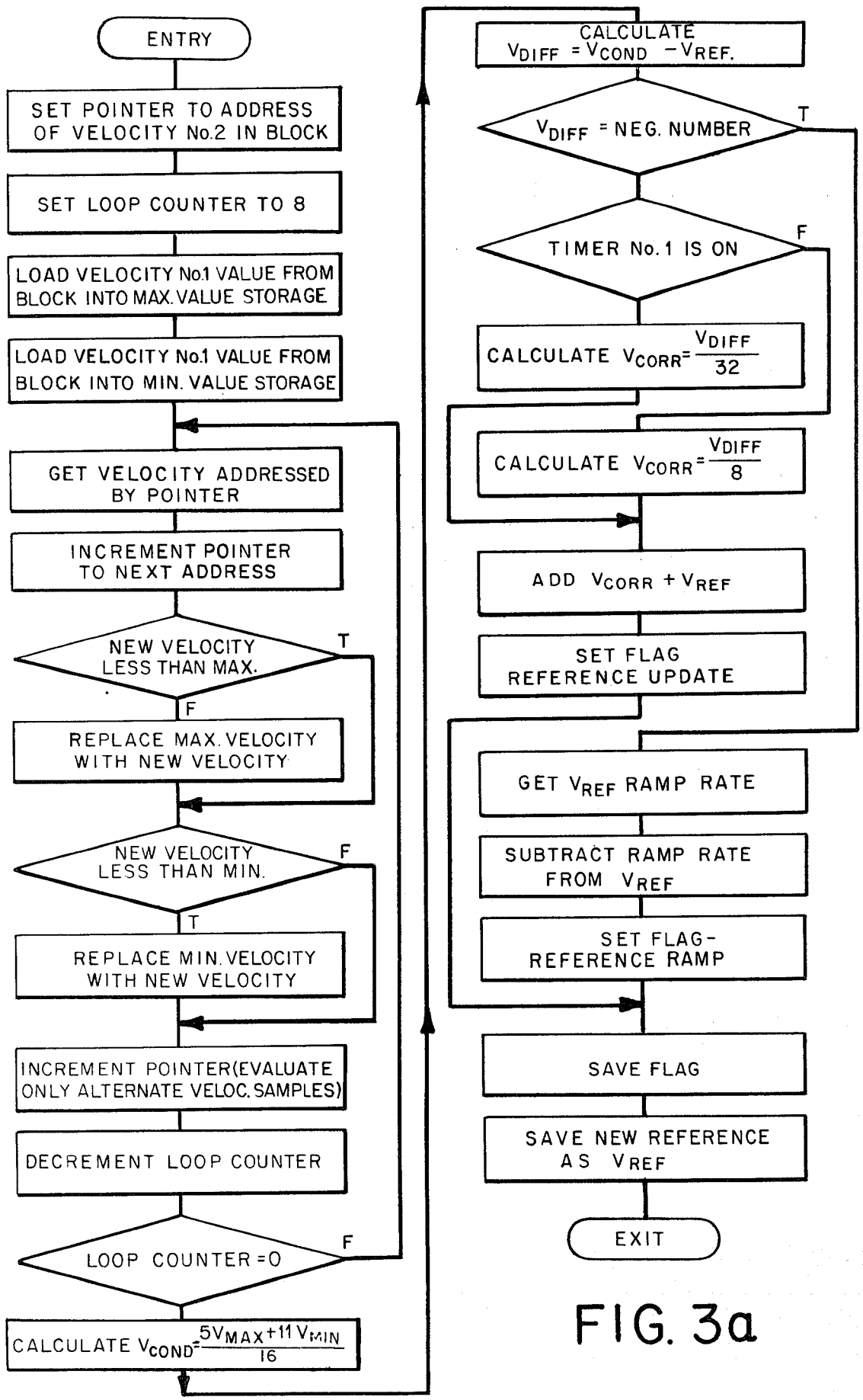
FIGS. 3a and 3b are flow charts of the reference velocity determination portion of the antiskid control system of FIG. 2.

Referring now to FIG. 3a, the preferred embodiment of this invention first searches every other wheel speed measurement in the block of sixteen wheel speed measurements and sets $V_{MAX}$ equal to the greatest wheel speed measurement and $V_{MIN}$ equal to the smallest wheel speed measurement of those searched. The first iterative loop in FIG. 3a determines $V_{MAX}$ and $V_{MIN}$ in a single pass.

Next a conditioned wheel speed signal, $V_{COND}$, is generated and is set to a value no greater than the average wheel speed $\frac{1}{2}(V_{MAX}+V_{MIN})$. In this embodiment, $V_{COND}$ is set equal to $\frac{1}{2}(V_{MAX}+V_{MIN})-3/16(V_{MAX}-V_{MIN})$. Thus, the amount by which $V_{COND}$ is less than the average of $V_{MAX}$ and $V_{MIN}$ is proportional to the difference between $V_{MAX}$ and $V_{MIN}$. The larger the oscillatory component of the wheel speed measurement in the selected frequency range, the more $V_{COND}$ is reduced below the average.

In this embodiment the velocity block contains sixteen measurements, each separated by about five milliseconds. Therefore, an oscillatory component having a half period less than about 70 milliseconds and greater than some upper limit will be effectively suppressed. Of course the frequency range in which oscillations are rejected may readily be modified by changing either the sampling rate or the number and choice of measurements stored in the velocity block.

After $V_{COND}$ has been determined, it is compared with $V_{REF}$, the reference velocity established during the last pass through the program, to determine which is the greater. Depending on which is the greater, $V_{REF}$ will then either be updated to a larger value, corresponding to a higher reference velocity, or be ramped to a smaller value, corresponding to a lower reference velocity.

Assuming that $V_{REF}$ is less than $V_{COND}$, $V_{REF}$ is updated by an amount proportional to $V_{DIFF}$, where $V_{DIFF}$ is equal to $V_{COND}-V_{REF}$. Assuming a constant $V_{COND}$, this causes $V_{REF}$ to asymtolically approach $V_{COND}$. A timer is used to set the proportionality constant which determines the rate at which $V_{REF}$ approaches $V_{COND}$. If a time is on, $V_{REF}$ is updated by 1/32 of $V_{DIFF}$, while if the timer is off, $V_{REF}$ is updated by $\frac{1}{8}$ of $V_{DIFF}$. This feature has been found useful in providing rapid update of $V_{REF}$ under certain conditions, when the timer is off.

If, on the other hand, $V_{REF}$ is greater than $V_{COND}$, $V_{REF}$ will be ramped by an amount equal to two times a predetermined amount, the ramp rate. The ramp rate is a constant which is determined in the program flowcharted in FIG. 3b, and is not a function of $V_{DIFF}$, as is the correction during the update of $V_{REF}$.

After $V_{REF}$ has been updated or ramped, as appropriate, it is stored as the new $V_{REF}$, for use in conjunction with other parts of the antiskid system, such as the PBM unit, for example, in the generation of an appropriate skid control signal. In general, $V_{REF}$ is representative of the desired wheel speed signal for optimum braking. Since $V_{REF}$ is either updated or ramped in each pass through the program, the change in $V_{REF}$ is only a function of the appropriate variables. Update is a function of the difference between $V_{REF}$ and $V_{COND}$, and ramping is a function of the ramp rate. In that ramping and updating are not performed simultaneously, the change in $V_{REF}$ can be made a precise function of only the appropriate variables.

Figure 3B:
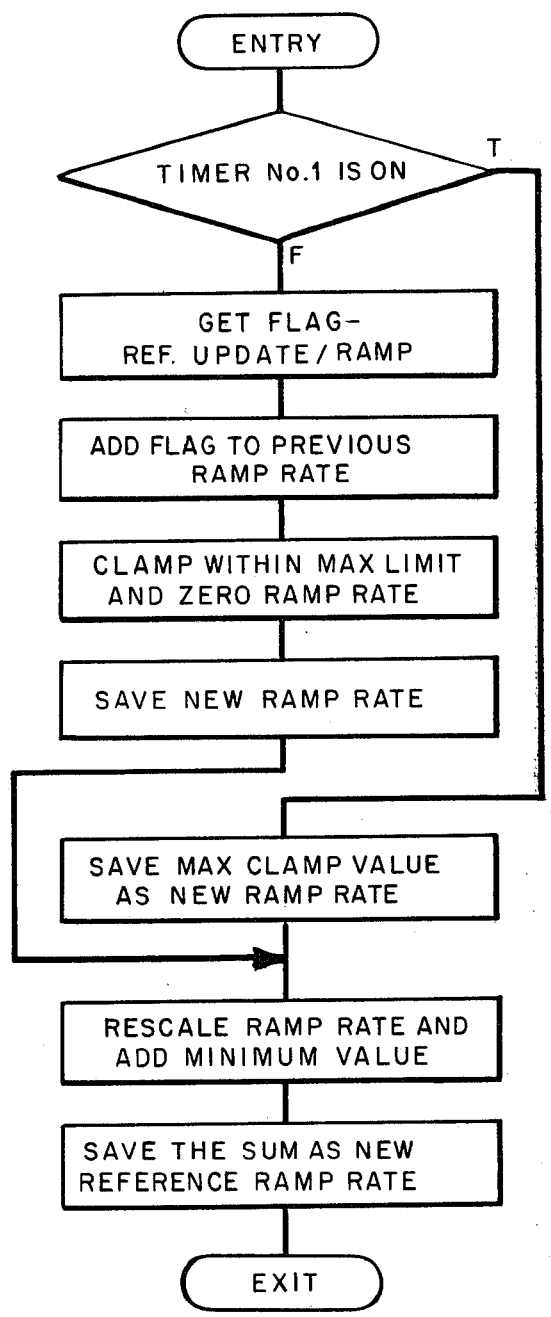

The manner in which $V_{REF}$ is changed (updated or ramped) is used as an input to the program flowcharted in FIG. 3b. This program modifies the ramp rate by an amount which varies, depending on whether $V_{REF}$ has been updated or ramped.

As shown in FIG. 3b, the ramp rate is modified by adding to it an amount which is itself a function of whether $V_{REF}$ has been updated or ramped. Thus, if $V_{REF}$ has been updated, indicating that $V_{REF}$ was less than $V_{COND}$, then the ramp rate is decreased by adding a negative number to it. In this way the rate at which $V_{REF}$ is ramped is decreased, and therefore the frequency of $V_{REF}$ updates is decreased. On the other hand, if $V_{REF}$ has been ramped, indicating that $V_{COND}$ is less than $V_{REF}$, then the ramp rate is increased by adding a positive number to it. This increases the rate at which $V_{REF}$ is ramped, and therefore increases the rate at which $V_{REF}$ approaches $V_{COND}$. This tends to increase the frequency of $V_{REF}$ updates.

Thus, the ramp rate is established as a dynamic balance which tends to seek a certain $V_{REF}$ update frequency. Too many updates cause the ramp rate to be reduced, which in turn tends to reduce the number of updates. Too few updates cause the ramp rate to be increased, which in turn tends to increase the number of updates. The sensitivity and operation of this embodiment can be altered by changing the values of the positive and negative numbers which are added to the ramp rate after ramping and updating, respectively. In this embodiment, the ramp rate is increased by about 0.0001 feet per second each time $V_{REF}$ is ramped and is decreased by about 0.0008 feet per second each time $V_{REF}$ is updated.

The program of FIG. 3b also includes means, responsive to a timer, for setting the ramp rate to a maximum value whenever the timer is on. This feature is used to provide a high ramp rate, and therefore a low $V_{REF}$, during certain periods of operation, when the timer is on. This program also includes means for clamping the ramp rate between certain maximum and minimum values and for adding a DC offset to the ramp rate to ensure that the ramp rate is always greater than a certain minimum value.

This preferred embodiment is listed in assembly language in Tables 1a, 1b, and 1c. Table 1a corresponds to the program of FIG. 3a; Table 1b corresponds to the program of FIG. 3b; and Table 1c provides a listing of the constants and variables used by the programs of Tables 1a and 1b. In order to better understand these listings, it should be understood that the wheel speed measurements stored in the velocity block as VELOC1 through VELOC7 are stored as sixteen-bit binary numbers scaled to 0.1 foot per second per bit. $V_{REF}$ corresponds to the variable REFER which is a twenty-four-bit binary number scaled to about 0.000391 foot per second per bit, and the ramp rate corresponds to RAMP and is scaled identically to REFER. Preferably the programs of Tables 1a and 1b are both executed after each wheel speed measurement is made, about once every 5 milliseconds in this embodiment.

In simulation testing, the embodiment described above has been shown to generate a reference signal which adapts quickly and appropriately to changing braking conditions such as changes in the coefficient of friction between the braked wheel and the support surface. Furthermore, this embodiment responds to oscillations in the measured wheel speed signal in a manner which both suppresses undesired oscillations and appropriately reduces the magnitude of the conditioned signal used to form the reference signal.

Of course, it should be understood that various changes and modifications to the preferred embodiment described herein will be apparent to those skilled in the art. For example, the invention is not limited to digital embodiments or to velocity based systems. On the contrary, it may be embodied in analog systems, and it may be used to generate an acceleration reference in acceleration based brake control systems. Such changes and modifications can be made without departing from the spirit and scope of the present invention and without diminishing its attendant advantages. It is, therefore, intended that such changes and modifications be covered by the following claims.

TABLE 1a

```
;       REFERENCE VELOCITY DETERMINATION
;       ********************************************
;
REFX    LD HL,VELOC2
        LD B,7; LOOP COUNT
        EXX
        LD DE,(VELOC1)
        LD B,D
        LD C,E
        EXX

;
REFA    LD A,(HL); SET LOW BYTE
        EX AF,AF
        INC HL
        LD A,(HL); SET HIGH BYTE
        INC HL
        EXX
        LD H,A
        EX AF,AF
```

TABLE 1a-continued

```
                LD L,A; MOVE VELOCITY TO HL
                CP A
                SBC HL,DE; COMPARE WITH MAX
                JR NC,REFB
                ADD HL,DE; RECOVER NEW VELOCITY
                JR REFC
REFB            ADD HL,DE; RECOVER NEW VELOCITY
                LD D,H
                LD E,L
REFC            CP A
                SBC HL,BC; COMPARE WITH MIN VELOCITY
                JR NC,REFD
                LD C,A
                EX AF,AF
                LD B,A; SAVE NEW AS MIN
REFD            EXX
                INC HL; SKIP EVERY OTHER VELOCITY IN BLOCK
                INC HL
                DJNZ REFA; LOOP FOR WHOLE VELOCITY BLOCK
;
                EXX
                LD H,D
                LD L,E; MOVE MAX VELOCITY
                XOR A
                SBC HL,BC; GET DIFFERENCE
                EX DE,HL
                ADD HL,BC
                SRL D
                RR E; DIVIDE BY 2
                XOR A
                SBC HL,DE
                SRL D
                RR E
                ADD HL,DE
                SRL D
                RR E
                XOR A
                SBC HL,DE
                SRL H
                RR L
                LD DE,(REFER + 1)
                XOR A
                SBC HL,DE
                JR C,REFE
;
;               REFERENCE UPDATE
;
                LD C,L
                LD L,H
                LD H,O
                LD A,(FORTIM); GET TIMER VALUE
                CP O
                JR NZ, REFK
                JR REFF; FINE TUNE ADDRESS DURING TESTING
                SLA C
                ADC HL,HL
                SLA C
                ADC HL,HL
REFF            SLA C
                ADC HL,HL
                SLA C
                ADC HL,HL
REFK            SLA C
                ADC HL,HL
                SLA C
                ADC HL,HL
                SLA C
                ADC HL,HL
                LD A,(REFER)
                ADD A,C
                ADC HL,DE
                LD (REFER + 1),HL; UPDATE REFERENCE
                LD (REFER),A
                LD DE,RTDOWN
                JR REFG
;
;               REFERENCE RAMP
;
REFE            EX DE,HL; MOVE REFERENCE TO HL
                LD A,(RAMP)
                LD C,A
                LD A,(REFER); GET SCALER
```

TABLE 1a-continued

```
            LD DE,O
            SUB C
            SBC HL,DE; SUBTRACT CARRY IF ANY
            JR C,REFH
            SUB C
            SBC HL,DE
            JR NC,REFI
REFH        LD HL,O
REFI        LD (REFER),A; SAVE NEW SCALER
            LD (REFER + 1),HL; SAVE NEW REFERENCE
            LD DE,RTUP
;
REFG        LD (SCORE),DE
;
            LD DE,MAXREF; REFERENCE LIMIT (ANY SPEED ABOVE
;           THIS CONSTITUTES A FAILURE)
            EX DE,HL
            XOR A
            SBC HL,DE
            JR NC,REFJ; JUMP, REFERENCE WITHIN RANGE
            LD DE,MAXREF; OTHERWISE CLAMP REFERENCE
            LD (REFER + 1),DE
REFJ        RET; RETURN
```

TABLE 1b

```
;           REFERENCE RAMP RATE DETERMINATION
;           **********************************************
;
AVDECX      LD A,(FORTIM)
            CP O
            JR NZ,AVDECC
            LD DE,(SCORE)
            LD HL,(DECEL)
            ADD HL,DE
            LD (DECEL),HL
            EX DE,HL
            BIT 7,D
            JR Z,AVDECB
```

TABLE 1b-continued

```
            LD DE,O
            JR AVDECA
AVDECB      LD HL,MAXDEC*256
            XOR A
            SBC HL,DE
            JR NC,AVDECA
AVDECC      LD DE,MAXDEC*256
AVDECA      LD (DECEL),DE
            LD A,D
            ADD A,MINDEC
            LD (RAMP),A
            RET;        RETURN
```

TABLE 1c

```
;           *******
;           *     *
;           * RAM *
;           *     *
;           *******
;
;
DECEL    EQU 80EH; REF RAMP RATE (TWO BYTES)
ERROR    EQU 815H; ERROR VALUE FOR CONTROL (TWO BYTES)
FORTIM   EQU 811H; TIMER FOR SLOW REFER. UPDATE
RAMP     EQU 810H; TIME CONSTANT FOR REFERENCE RATE
REFER    EQU 807H; REFERENCE (THREE BYTES)
SCORE    EQU 81BH; TEMP STORAGE FOR REFER RATE GENERATION
VELOC1   EQU 820H; NEW VELOCITY
VELOC2   EQU 822H; PREVIOUS VELOCITY (ONE LOOP TIME BACK)
VELOC3   EQU 824H; PREVIOUS VELOCITY (TWO LOOP TIMES BACK)
VELOC4   EQU 826H; PREVIOUS VELOCITY (THREE LOOP TIMES BACK)
VELOC5   EQU 828H; PREVIOUS VELOCITY (FOUR LOOP TIMES BACK)
VELOC6   EQU 82AH; PREVIOUS VELOCITY (FIVE LOOP TIMES BACK)
VELOC7   EQU 82CH; PREVIOUS VELOCITY (SIX LOOP TIMES BACK)
VELOC8   EQU 82EH; PREVIOUS VELOCITY (SEVEN LOOP TIMES BACK)
VELOC9   EQU 830H; PREVIOUS VELOCITY (EIGHT LOOP TIMES BACK)
VELOC10  EQU 832H; PREVIOUS VELOCITY (NINE LOOP TIMES BACK)
VELOC11  EQU 834H; PREVIOUS VELOCITY (TEN LOOP TIMES BACK)
VELOC12  EQU 836H; PREVIOUS VELOCITY (ELEVEN LOOP TIMES BACK)
VELOC13  EQU 838H; PREVIOUS VELOCITY (TWELVE LOOP TIMES BACK)
VELOC14  EQU 83AH; PREVIOUS VELOCITY (THIRTEEN LOOP TIMES BACK)
VELOC15  EQU 83CH; PREVIOUS VELOCITY (FOURTEEN LOOP TIMES BACK)
VELOC16  EQU 83EH; PREVIOUS VELOCITY (FIFTEEN LOOP TIMES BACK)
;
;           ***************************
;           *                         *
;           *GENERAL CONSTANTS  *
;           *                         *
;           ***************************
;
;
MAXREF   EQU ODACH; CLAMP FOR MAX REFERENCE VALUE (350 FT/SEC)
```

TABLE 1c-continued

| | |
|---|---|
| MINDEC | EQU 24; MINIMUM DECEL |
| MAXDEC | EQU 70H; MAXIMUM DECEL |
| RTUP | EQU 40H |
| RTDOWN | EQU - 200H |

I claim:

1. An apparatus for generating a reference signal representative of a reference braking condition in a brake control system, said brake control system including means for generating a wheel signal representative of a braking condition of a braked wheel, said apparatus comprising:

means for storing a reference signal representative of a reference braking condition;

means for storing a rate signal;

rate signal adjustment means for causing the stored rate signal to seek a value indicative of braking conditions by seeking a dynamic balance between increments and decrements to the stored rate signal, said rate signal adjustment means comprising:

rate signal increment means for increasing the stored rate signal by adding selected value to the stored rate signal solely when the stored reference signal is compared with the wheel signal and found to be greater than the wheel signal; and rate signal decrement means for decreasing the stored rate signal by subtracting a selected value from the stored rate signal solely when the stored reference signal is compared with the wheel signal and found not to be greater than the wheel signal;

means for increasing the stored reference signal when the wheel signal is greater than the stored reference signal; and means for decreasing the stored reference signal by an amount corresponding to the stored rate signal when the stored reference signal is greater than the wheel signal.

2. An apparatus for generating a reference signal representative of a reference braking condition in a brake control system, said brake control system including means for generating a wheel signal representative of a braking condition of a braked wheel, said apparatus comprising:

means for storing a reference signal representative of a reference braking condition;

means for storing a rate signal;

rate signal adjustment means for causing the stored rate signal to seek a value indicative of braking conditions by seeking a dynamic balance between increments and decrements to the stored rate signal, said rate signal adjustment means comprising:

rate signal increment means for increasing the stored rate signal by adding a selected value to the stored rate signal when the stored reference signal is compared with the wheel signal and found to correspond to a less severe braking condition than does the wheel signal; and rate signal decrement means for decreasing the stored rate signal by subtracting a selected value from the stored rate signal when the stored reference signal is compared with the wheel signal and found to correspond to a more severe braking condition than does the wheel signal;

means for modifying the stored reference signal to correspond to a less severe braking condition when the stored reference signal corresponds to a more severe braking condition than does the wheel signal; and means for modifying the stored reference signal by an amount corresponding to the stored rate signal to correspond to a more severe braking condition when the wheel signal corresponds to a more severe braking condition than does the stored reference signal.

3. An apparatus for generating a reference signal representative of a reference velocity in a brake control system, said brake control system including means for generating a velocity signal representative of the rotational velocity of a braked wheel, said apparatus comprising:

means for storing a reference signal representative of a reference velocity;

means for storing a ramp signal;

ramp signal adjustment means for causing the stored ramp signal to seek a value indicative of braking conditions by seeking a dynamic balance between increments and decremenets to the stored ramp signal, said ramp signal adjustment means comprising:

ramp signal incremenet means for increasing the stored ramp signal by adding a selected value to the stored ramp signal when the stored reference signal is compared with the velocity signal and found to be greater than the velocity signal; and ramp signal decrement means for decreasing the stored ramp signal by subtracting a selected value from the stored ramp signal when the stored reference signal is compared with the velocity signal and found not to be greater than the velocity signal;

means for increasing the stored reference signal when the velocity signal is greater than the stored reference signal; and means for decreasing the stored reference signal by an amount corresponding to the stored ramp signal when the stored reference signal is greater than the velocity signal.

4. An apparatus for generating a reference signal representative of a reference velocity in a brake control system, said brake control system including means for generating a velocity signal representative of the rotational velocity of a braked wheel, said apparatus comprising:

means for storing a reference signal representative of a reference velocity;

means for storing a ramp signal;

ramp signal adjustment means for causing the stored ramp signal to seek a value indicative of braking conditions by seeking a dynamic balance between increments and decrements to the stored ramp signal, said ramp signal adjustment means comprising:

ramp signal increment means for increasing the stored ramp signal by adding a selected value to the stored ramp signal solely when the stored reference signal is compared with the velocity signal and the velocity corresponding to the stored reference signal is found to be greater than the velocity corresponding to the velocity signal by more than a first value; and ramp signal decrement means for decreasing the stored ramp signal by subtracting a selected value from the stored ramp signal solely when the stored reference signal is compared with the velocity signal and the velocity corresponding to the velocity signal is found to be greater than the velocity corresponding to the stored reference signal by more than a second value; and means for modifying the stored reference signal by an amount corresponding to the magnitude of the stored ramp signal when the velocity corresponding to the stored reference signal is greater than the velocity corresponding to the velocity signal by more than a third value.

5. The apparatus of claim 4, wherein the modifying means decreases the stored reference signal by an amount corresponding to the magnitude of the stored ramp signal.

6. An apparatus for generating a reference signal representative of a reference braking condition in a brake control system, said brake control system including means for generating a wheel signal representative of a braking condition of a braked wheel, said apparatus comprising:
   means for storing a reference signal representative of a reference braking condition;
   means for storing a ramp signal;
   means for comparing the stored reference signal with the wheel signal, said comparing means comprising:
      means for generating a first control signal when the braking condition corresponding to the wheel signal is lower than the braking condition corresponding to the reference signal by more than a first value; and
      means for generating a second control signal when the braking condition corresponding to the wheel signal is greater than the braking condition corresponding to the reference signal by more than a second value;
   adjustment means for causing the stored ramp value to seek a value indicative of braking conditions by seeking a dynamic balance between increments and decrements to the stored ramp value, said adjustment means comprising:
      means for increasing the stored ramp value in response to one of the first and second control signals; and
      means for decreasing the stored ramp value in response to the other of the first and second control signals; and
   means for selectively modifying the stored reference signal by an amount corresponding to the stored ramp signal.

7. An apparatus for generating a reference signal representative of a reference braking condition in a brake control system, said brake control system including means for generating a wheel signal representative of a braking condition of a braked wheel, said apparatus comprising:
   means for storing a reference signal representative of a reference braking condition;
   means for generating a first control signal when the reference signal is greater than the wheel signal by more than a first predetermined amount;
   means for generating a second control signal when the wheel signal is greater than the reference signal by more than a second predetermined amount;
   means, operative only in response to the first control signal, for modifying the stored reference signal in a first direction; and
   means, operative only in response to the second control signal, for modifying the stored reference signal in a second direction, opposed to the first direction, by an amount which is less than the difference between the stored reference signal and the wheel signal.

8. An apparatus for generating a reference signal representative of a reference braking condition in a brake control system, said brake control system including means for generating a wheel signal representative of a braking condition of a braked wheel, said apparatus comprising:
   means for storing a reference signal representative of a reference braking condition;
   means for generating a first control signal when the reference signal is greater than the wheel signal by more than a first predetermined amount;
   means for generating a second control signal when the wheel signal is greater than the reference signal by more than a second predetermined amount;
   first means, operative in response to only one of the first and second control signals, for increasing the stored reference signal by an amount which is less than the difference between the stored reference signal and the wheel signal; and
   second means, operative in response to only the other of the first and second control signals, for decreasing the stored reference signal.

9. The apparatus of claim 8 wherein the first means is operative only in response to the second control signal and the second means is operative only in response to the first control signal.

10. An apparatus for generating a reference signal representative of a reference velocity in a brake control system, said brake control system including means for generating a velocity signal representative of the rotational velocity of a braked wheel, said apparatus comprising:
   means for storing a reference signal representative of a reference velocity;
   means for generating a first control signal when the velocity corresponding to the reference signal exceeds the velocity corresponding to the velocity signal by more than a first predetermined amount;
   means for generating a second control signal when the velocity corresponding to the velocity signal exceeds the velocity corresponding to the reference signal by more than a second predetermined amount;
   means, operative only in response to the first control signal, for modifying the stored reference signal to correspond to a lower reference velocity; and
   means, operative only in response to the second control signal, for modifying the stored reference signal by an amount which is less than the difference between the stored reference signal and the velocity signal to correspond to a higher reference velocity.

11. An apparatus for generating a reference signal representative of a reference braking condition in a brake control system, said brake control system including means for generating a wheel signal representative of a braking condition of a braked wheel, said apparatus comprising:

means for generating a conditioned wheel signal representative of a braking condition greater than that of the average wheel signal during a predetermined time interval, said conditioned wheel signal generating means comprising:

means for determining a first wheel signal corresponding to the maximum braking condition and a second wheel signal corresponding to the minimum braking condition during a predetermined time interval;

means for forming the average of said first and second wheel signals;

means for forming the difference between the first and second wheel signals;

means for modifying said average toward an increased braking condition by an amount corresponding to said difference; and means for supplying said modified average as said conditioned wheel signal; and means, responsive to the conditioned wheel signal, for generating a reference signal representative of a reference braking condition.

12. An apparatus for generating a reference signal representative of a reference braking condition in a brake control system, said brake control system including means for generating a wheel signal representative of a braking condition, said apparatus comprising:

means for determining the maximum and minimum wheel signal during a first time interval;

means for generating a conditioned wheel signal corresponding to a braking condition greater than that corresponding to the average of the maximum and minimum wheel signals; and means, responsive to said conditioned wheel signal, for generating a reference signal representative of a reference braking condition.

13. The apparatus of claim 12 wherein the conditioned wheel signal generating means includes:

means for forming the average of said maximum and minimum wheel signals;

means for forming the difference between said maximum and minimum wheel signals; and means for modifying said average by an amount substantially proportional to said difference and for providing said modified average as said conditioned wheel signal.

14. An apparatus for generating a reference signal representative of a reference velocity in a brake control system, said brake control system including means for generating a velocity signal representative of the braked rotational velocity of a braked wheel, said apparatus comprising:

means for determining the maximum and minimum velocity signal during a first time interval;

means for generating a conditioned velocity signal corresponding to a velocity greater than the minimum velocity signal during said first time interval and less than the average of the maximum and minimum velocity signals; and means, responsive to said conditioned velocity signal, for generating a reference signal representative of a reference velocity.

15. The apparatus of claim 14, wherein the conditioned wheel signal generating means includes:

means for forming the average of the maximum and minimum velocity signals during said first time interval;

means for forming the difference between the maximum and minimum velocity signals during said first time interval; and means for reducing said average by an amount substantially proportional to said difference and for providing said reduced average as said conditioned velocity signal.

16. An apparatus for generating a reference signal representative of a reference velocity in a brake control system, said brake control system including means for generating a velocity signal representative of the braked rotational velocity of a braked wheel, said apparatus comprising:

means for determining the maximum and minimum velocity signal during a first time interval;

means for forming the average of said maximum and minimum velocity signals;

means for forming the difference between said maximum and minimum velocity signals;

means for reducing said average by an amount substantially proportional to said difference and for providing said reduced average as a conditioned velocity signal; and means, responsive to said conditioned velocity signal, for generating a reference signal representative of a reference velocity.

* * * * *